Feb. 22, 1927.
A. T. BROCH
1,618,169
GAS HEATER
Filed Oct. 30, 1924
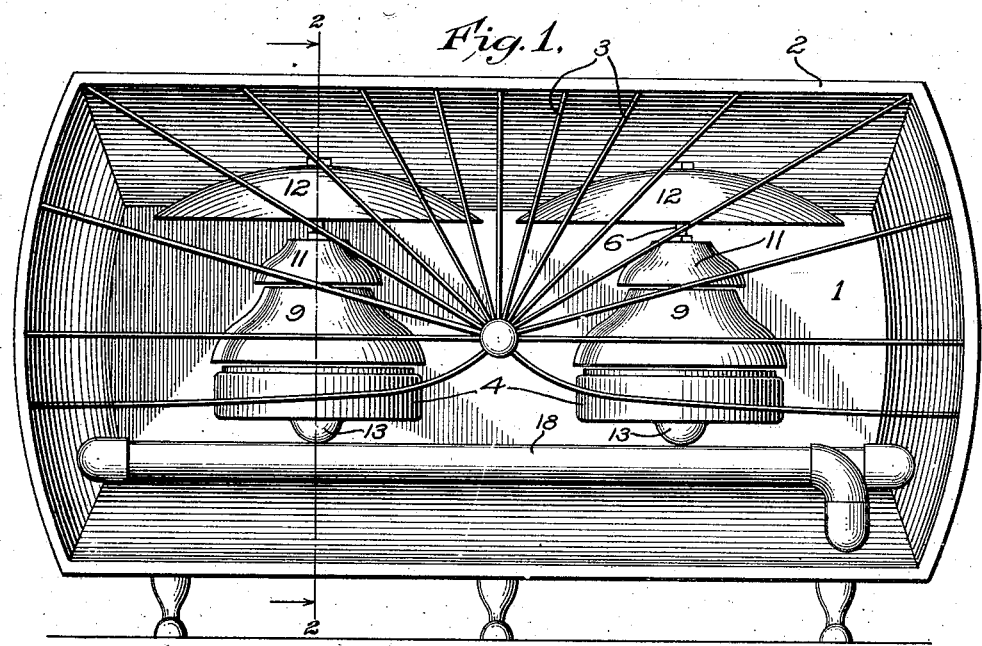
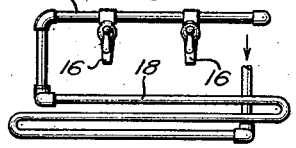
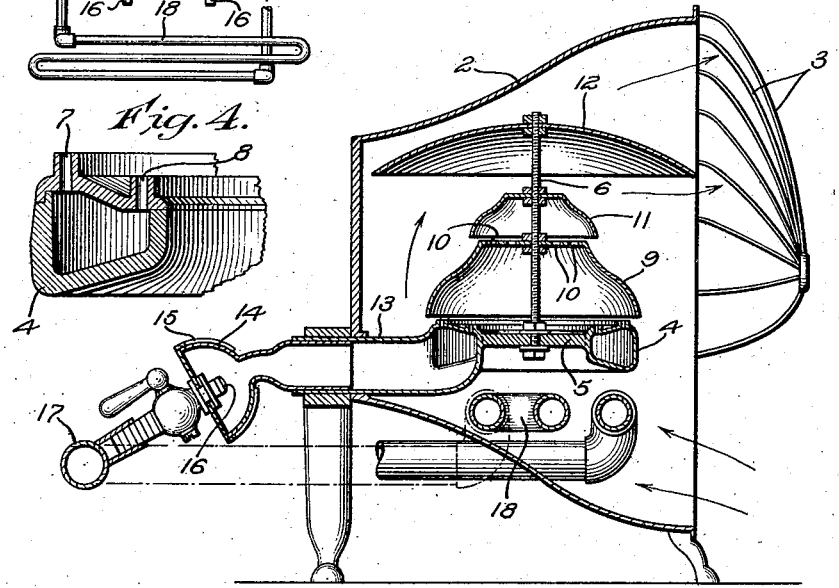
WITNESSES
INVENTOR
ALBERT T. BROCH
BY
ATTORNEYS Patented Feb. 22, 1927.

1,618,169

UNITED STATES PATENT OFFICE.

ALBERT T. BROCH, OF NEW YORK, N. Y.

GAS HEATER.

Application filed October 30, 1924. Serial No. 746,888.

This invention relates to a gas heater. An object of the invention is to provide a simple and efficient construction of gas heater whereby a maximum amount of heat can be deflected and radiated and circulated for a given consumption of gas.

Another object concerns the provision of simple and efficient means whereby the gas used for heating can be preheated in a simple manner before being burned.

A further object concerns the provision of simple and efficient means whereby the heat issuing from the burner can be directed most efficiently into the lower portion of the room.

A still further object concerns the provision of simple and efficient means whereby the construction is composed of a minimum number of simple and durable parts which can be readily assembled and disassembled.

The invention is illustrated in the drawings, of which—

Figure 1 is a front elevation of the device;

Fig. 2 is a section on the line 2—2 of Fig. 1;

Fig. 3 is a plan view of the preheating device; and

Fig. 4 is a section through a portion of the burner ring.

The form of the invention shown in the drawings is a preferred form, although it is understood that modifications in the construction and arrangement of the parts and in the character of the materials used may be adopted without departing from the spirit of the invention as set forth in the appended claims.

The general idea of the invention involves the provision of a deep reflector casing having curved walls within which one or more gas heating devices are located. The casing is provided with a screen across its upper forward open end for the purpose of protecting the clothing and parts of the body from coming in contact with the heater, otherwise the casing is entirely open. Near the burners proper, within the casing, a coil of piping is disposed for the purpose of passing the gas therethrough before reaching the burner, so as to preliminarily heat it. Each burner proper comprises a hollow ring forming a gas chamber having a plurality of rows of apertures in its upper surface through which the gas escapes and is ignited. Above the burner ring is disposed a mantle which is somewhat bell-shaped but of considerably larger diameter than the ring, to provide a combustion chamber to which air is introduced by the suction action of the gas jets. The upper surface of this mantle is apertured to permit the flame to pass thereout. Over the top of this mantle is a hood which is adapted to trap any unburned gas and to deflect the heat and flame downward along the outer surface of the mantle. The mantle and the hood are mounted on a single threaded stem supported from the burner ring. At the top of the stem above the hood and the mantle is disposed a reflector plate, somewhat curved concave downwardly, adapted to spread the heat out and distribute it more uniformly first into the lower portion of the room.

The burner ring is supplied with gas through a conduit to which suitable nozzles are connected, preferably at an angle, these nozzles being connected to the end of the conduit which is provided with air inlet adjusting means.

In the preferred form of the invention shown in the drawings, I provide a deep casing 1 having curved forwardly extending walls such as 2 and a screen 3, preferably of wire. Within the casing there are a plurality of burners, each of which comprises a hollow burner-ring 4 within which a gas chamber is formed. A crossbar 5 is connected integrally to the burner ring and supports a threaded stem 6.

The upper surface of the burner ring is provided with a plurality of rows of apertures 7 and 8 through which the gas escapes. Above the burner ring is located a mantle 9, preferably bell shape, and of considerably larger diameter at its lower edge than the burner ring. The upper surface of this mantle is perforated as at 10 to permit the gas and the flame to escape. On the stem 6 above the mantle 9 is located a hood 11, somewhat bell-shaped and adapted to receive any unburned gas to complete its combustion and to direct the heat and flame downward along the outer surface of the mantle 9.

On the stem 6 above the hood 11 is a reflector plate 12 of shallow configuration, concaved downwardly, and adapted to spread the heat out into the lower part of the room more effectively.

The burner ring 4 is connected by a conduit 13 to an air chamber 14 having means such as 15 for adjusting the admission of air. Gas nozzles 16 are connected to the end of the conduit at an angle so that the gas will enter the conduit in a direction moving forwardly and upwardly, which is found to more effectively project it into the burner ring and to do away with the liability of leakage. Each nozzle, and there may be several, is connected to a conduit 17 leading to a coil 18 disposed within the casing 1 near the burner ring 4, so that the gas is preliminarily heated before it gets to the nozzle. By reason of the fact that the burners are placed well forward within the deep casing, there is formed a chamber back of the burners and between them and the rear wall of the casing which acts as a heating chamber. The circulation of air, as indicated by the arrows, will naturally result in the air passing up not only through the burners but back of the burners into this chamber where it is very substantially heated by reason of the intense heat of the burners themselves and also by reason of the fact that the walls of the casing are very hot. The air thus heated in this heating chamber rises until it heats the shield or spreader 12 whereupon it is deflected downwardly and outwardly into the lower portion of the room.

In the operation of the device, the air-admission adjusting means is regulated and the nozzles are opened, the gas issuing from the burner ring being ignited by suitable means, the mantle 9 and the hood 11 become incandescent, the flame and heat spreading out and causing a suction of air up through the front of the casing, as shown by the arrows in Fig. 2, and past the burner. Some of the air goes under the mantle 9 and assists in burning the gas. A small portion of air will get in beneath the hood 11 to complete the combustion. The heated air will rise and strike the plate 12 and be spread out uniformly into the room. It is found that this device is extremely efficient in the consumption of gas and in the generation of heat as well as in the distribution of it.

What I claim is:

1. A gas heater device, which comprises a hollow ringlike burner having apertures in its upper surface, a stem connected to said burner projecting upwardly therefrom, a bell-shaped mantle on said stem above the burner, said mantle having a lower edge of a diameter considerably greater than the diameter of the burner, the upper surface of said mantle being apertured to permit the heat and flame to pass therethrough, and a hood on said stem above the mantle adapted to trap the unburned gases and complete their combustion and to deflect the heat and flames downwardly over the surface of the mantle, and a reflector plate disposed at the upper end of the stem to distribute and deflect the heat as it rises from the burner and the mantle outwardly into the lower portion of the room.

2. A gas heater device, which comprises a hollow ringlike burner having apertures in its upper surface, a stem connected to said burner projecting upwardly therefrom, a bell-shaped mantle on said stem above the burner, said mantle having a lower edge of a diameter considerably greater than the diameter of the burner, the upper surface of said mantle being apertured to permit the heat and flame to pass therethrough, a hood on said stem above the mantle adapted to trap the unburned gases and complete their combustion and to deflect the heat and flame downwardly over the upper surface of the mantle, a reflector plate disposed at the upper end of the stem to distribute the heat as it rises from the burner and the mantle and deflect the heat outwardly into the lower portion of the room, a deep heat-reflector casing in which said burner is disposed well forward therein, a conduit leading to said burner, a nozzle connected to said conduit, and a coil of pipe disposed in the casing near the burner, said coil connected to the nozzle whereby the gas is preheated before being admitted through the nozzle to the burner.

3. A gas heater device, which comprises a deep reflector casing, a gas burner placed well forwardly within said casing, a mantle above said burner, a shield mounted on the burner above said mantle, the space between the burner and the rear wall of the casing forming a heating chamber in which the air entering the lower portion of the casing is substantially heated, the shield above the burner acting to deflect said heated air downwardly and outwardly from the reflecting casing.

4. A gas heater device, which comprises a plurality of hollow ringlike burners having apertures in their upper surfaces, a plurality of conduits leading to said burners, nozzles connected to said conduits, a coil of pipe disposed near said burners, said coil connected to the nozzles whereby the gas is preheated before being admitted through the nozzles to the burners, a bar formed integrally with each burner and extending across the open center thereof, a threaded stem projecting upwardly from each of said bars, bell-shaped mantles on said stems above the burners, said mantles having lower edges of a diameter considerably greater than that of the burners, the upper surfaces of the mantles being apertured to permit the heat, flame and surplus gas to pass therethrough, hoods on said stems above the mantles adapted to trap the unburned gases and complete their combustion and to deflect the heat and flame downwardly over the upper surfaces of the mantles, reflector plates disposed on the upper ends of said stems to deflect and distribute the heat as it rises from the burners and the mantles into the lower portion of the room, and a deep reflector casing in which the burners are placed well forwardly, the space between the burners and the rear wall thereof forming an intensely hot air-heating chamber, said air entering the casing at the lower portion thereof, going up through the heating chamber and coming out between the hot casing, the deflecting hoods and the red-hot mantles into the lower portion of the room.

ALBERT T. BROCH.